United States Patent Office 2,733,239
Patented Jan. 31, 1956

2,733,239

PROCESS FOR THE SEPARATION OF SULPHUR FROM OXIME-SULPHUR MIXTURES

Aloys Giltges and Harry Welz, Krefeld, Germany, assignors to Farbenfabriken Bayer Aktiengesellschaft, Leverkusen, Germany, a corporation of Germany No Drawing. Application May 24, 1954,
Serial No. 432,032

Claims priority, application Germany May 28, 1953

9 Claims. (Cl. 260—239.3)

In the preparation of oximes by the reduction of salts of mononitro cycloalkanes with hydrogen sulphide in an acid solution according to the application Ser. No. 260,320 oxime-sulphur mixtures accrue.

The separation of the oximes and sulphur can be carried out with organic solvents, such as for example, alcohol. The oximes obtained in this way are, however, not sulphur-free. The dissolving of oximes in caustic alkali solution and reprecipitation with mineral acid does not yield sulphur-free products, because sulphur dissolves too, which, on neutralizing with mineral acid precipitates again along with the oxime.

An improvement of the last aforesaid process consists in the reprecipitation of the oxime with hydrogen sulphide according to application Ser. No. 333,009.

According to the present invention the sulphur is separated from oxime-sulphur mixtures in a technically especially advantageous manner by treating the mixture with liquid sulphur dioxide. The oxime is thereby dissolved and there remains practically completely pure sulphur which can easily be filtered off. The yield of sulphur is quantitative. The solution of the oxime in sulphur dioxide can thereafter be further treated in any desired manner. Thus, for instance, the oxime can be practically quantitatively recovered by vapourizing the sulphur dioxide and can, if necessary, be further treated after further purification processes.

Oximes which may be in mixture with sulphur are for example acetaldoxime, propylic aldoxime, butyric aldoxime, valeric aldoxime, caproic aldoxime, oenanthic aldoxime, caprylic aldoxime, pelargonic aldoxime, capric aldoxime, acetone oxime, methyl-ethyl-ketone oxime, diethyl ketone oxime, ethyl-propyl-ketone oxime, cyclopentanone oxime, cyclohexanone oxime, cycloheptanone oxime, 1-methyl-cyclopentanone-oxime-3, and 1-methyl-cyclohexanone-oxime-2.

The technically most important oximes are the cycloaliphatic oximes which are generally transformed into the corresponding lactams by a Beckmann reaction. For such an aftertreatment, for instance of cyclohexanone oxime, the foregoing process is especially suitable since it is not necessary to separate the sulphur before the introduction of the lactamizing reagent, for instance the sulphuric acid or preferably oleum or sulphur trioxide from the oxime solution, furthermore the treatment of the oxime-sulphur mixture with liquid sulphur dioxide and the transformation into the lactam can be carried out in one single stage. The oxime-sulphur mixture is advantageously introduced simultaneously with the required quantity of the lactamizing reagent, e. g. oleum or sulphur trioxide, into the liquid sulphur dioxide. The filtering off of the sulphur is then carried out after the reaction. This procedure possesses also the advantage that the duration of the period for which the oxime remains in the liquid sulphur dioxide is only very short, which has a favourable effect on the yield.

The process may be carried out at any temperature at which the sulphur dioxide is liquid, eventually under corresponding pressures. Suitable temperatures are for instance from about —40° to about +40° C. and especially from about —25° to about +10° C. With simultaneous introduction of a lactamizing agent for example of oleum, as described above, suitable temperatures are from about —14° to about —18° C.

The following examples are given for the purpose of illustrating the invention.

*Example 1*

100 grams of a mixture obtained by reduction of 1-nitro-hexane with hydrogen sulphide which consists of 72 grams of capronic aldoxime and 28 grams of sulphur, is brought into contact with 160 grams of liquid sulphur dioxide at —20° C. whereby the oxime is completely dissolved. The mixture is then filtered. The whole of the sulphur remains on the filter. The sulphur dioxide is vapourized from the filtrate and the residue consists of the sulphur-free oxime.

*Example 2*

400 grams of a mixture obtained by reduction of nitro-cyclohexane with hydrogen sulphide, which consists of 292 grams of cyclohexanone oxime, and 108 grams of sulphur is introduced together with 220 grams of 65% oleum with stirring into about 600 ml. liquid sulphur dioxide at a temperature of from —14° to —18° C. After the resulting reaction, the reaction mixture is filtered. After washing and drying 108 grams of sulphur remain on the filter. The filtrate is neutralized after vapourization of the sulphur dioxide and the separated raw lactam oil distilled. The yield of caprolactam amounts to 96 to 98%, calculated on the oxime used.

We claim:

1. Process for separating sulphur from solid oxime-sulphur mixtures obtained by reducing salts of material selected from the group consisting of saturated primary and secondary mononitro hydrocarbons of the aliphatic and cycloaliphatic series with hydrogen sulphide in an acid solution, comprising treating the mixture with liquid sulphur dioxide and separating the sulphur from the sulphur dioxide phase.

2. Process for separating sulphur from solid oxime-sulphur mixtures obtained by reducing salts of material selected from the group consisting of saturated primary and secondary mononitro hydrocarbons of the aliphatic and cycloaliphatic series with hydrogen sulphide in an acid solution, comprising treating the mixture with liquid sulphur dioxide and separating the sulphur from the sulphur dioxide phase working at temperatures from about —40° C. to about +40° C. and under corresponding pressures.

3. Process for separating sulphur from solid oxime-sulphur mixtures obtained by reducing salts of material selected from the group consisting of saturated primary and secondary mono-nitro hydrocarbons of the aliphatic series with hydrogen sulphide in an acid solution, comprising treating the mixture with liquid sulphur dioxide and separating the sulphur from the sulphur dioxide phase working at temperatures from about —40° C. to about +40° C. and under corresponding pressures.

4. Process for separating sulphur from solid oxime-sulphur mixtures obtained by reducing salts of saturated primary mono-nitro hydrocarbons of the aliphatic series with hydrogen sulphide in an acid solution, comprising treating the mixture with liquid sulphur dioxide and separating the sulphur from the sulphur dioxide phase working at temperatures from about —40° C. to about +40° C. and under corresponding pressures.

5. Process for separating sulphur from solid oxime-sulphur mixtures obtained by reducing a salt of 1-nitro hexane with hydrogen sulphide in an acid solution, comprising treating the mixture with liquid sulphur dioxide and separating the sulphur from the sulphur dioxide phase working at about −20° C.

6. Process for separating sulphur from solid oxime-sulphur mixtures obtained by reducing salts of saturated cycloaliphatic mononitro hydrocarbons with hydrogen sulphide in an acid solution, comprising treating the mixture with liquid sulphur dioxide and separating the sulphur from the sulphur dioxide phase working at temperatures from about −40° C. to about +40° C. and under corresponding pressures.

7. Process for separating sulphur from solid oxime-sulphur mixtures obtained by reducing a salt of nitro cyclohexane with hydrogen sulphide in an acid solution, comprising treating the mixture with liquid sulphur dioxide and separating the sulphur from the sulphur dioxide phase working at temperatures from about −40° C. to about +40° C. and under corresponding pressures.

8. Process for separating sulphur from solid oxime-sulphur mixtures obtained by reducing salts of saturated cycloaliphatic mononitro hydrocarbons with hydrogen sulphide in an acid solution, comprising introducing the oxime-sulphur mixture together with a lactamizing reagent into liquid sulphur dioxide and separating the sulphur from the sulphur dioxide phase working at temperatures from about −40° C. to about +40° C. and under corresponding pressures.

9. Process for separating sulphur from solid oxime-sulphur mixtures obtained by reducing a salt of nitro cyclohexane with hydrogen sulphide in an acid solution comprising introducing the oxime-sulphur mixture together with oleum into liquid sulphur dioxide and separating the sulphur from the sulphur dioxide phase working at temperatures from about −18° C. to about −14° C.

No references cited.